United States Patent [19]
Forseth

[11] 3,748,100
[45] July 24, 1973

[54] CARBON BLACK APPARATUS
[75] Inventor: Glenn J. Forseth, Borger, Tex.
[73] Assignee: Phillips Petroleum Company, Bartlesville, Okla.
[22] Filed: Apr. 26, 1971
[21] Appl. No.: 137,438

[52] U.S. Cl.............. 23/259.5, 423/450, 423/455, 431/186, 431/189, 165/118
[51] Int. Cl. .......................... C09c 1/48, F23c 5/06
[58] Field of Search.................... 23/259.5, 209.4, 23/209.6; 431/186, 189; 423/459

[56] References Cited
UNITED STATES PATENTS
2,625,466  1/1953  Williams ..................... 23/259.5 X
300,018    6/1884  Scannell ......................... 48/176 X
2,992,074  7/1961  Balka et al..................... 23/259.5 X Primary Examiner—James H. Tayman, Jr.
Attorney—Young and Quigg

[57] ABSTRACT

A carbon black reactor comprised of a plurality of sections in contiguous relationship, the upstream wall of one of the reactors being positionable to alter the length of the first zone of the reactor.

5 Claims, 3 Drawing Figures

INVENTOR.
G. J. FORSETH

INVENTOR.
G. J. FORSETH

CARBON BLACK APPARATUS

This invention relates to apparatus for the production of carbon black.

In one of its more specific aspects, this invention relates to a reactor in which carbon blacks of various types can be produced.

There recently has been developed a carbon black reactor in which large particle furnace blacks can be produced, these blacks being produced largely because of the large size of the reactor and the attendant low velocities of the reactants therethrough. In general, this reactor is vertically positioned, of cylindrical configuration, and of substantially uniform diameter throughout its length.

Because such reactors are of such large diameters, they would inherently have very large capacities if employed for the production of smaller particle blacks. Accordingly, such reactors would be of increased value if they could be mechanically convertible from reactors which produce large particle blacks into reactors which produce unusually large quantities of smaller particle blacks.

There has now been developed a modified version of the large particle black reactor in which a large quantity of smaller particle size blacks can also be produced. This invention provides that modification which involves a reactor in which an optionally-employed reaction section is positioned prior to the principal reaction section, this optionally-employed reaction section being of variable length depending upon the velocity it is desired to impart to the reactants in order to produce a black of selected particle size.

According to this invention there is provided a carbon black reactor which comprises a plurality of sections in contiguous relationship. The sections comprise an upper and a lower reaction section, the upper section being of smaller cross sectional area than the lower section. A wall closes the upstream portion of the reactor and the upstream end of the upper or first section. This wall is movably positionable along the longitudinal axis of the reactor and substantially perpendicular to it. When the wall is at its maximum upstream position, the first section is at its maximum length. When the wall is positioned at the inlet to the lower or second reactor section, the first section is substantially eliminated.

The apparatus of this invention will be more readily understood if explained in conjunction with the attached drawing in which FIG. 1 illustrates, in elevation, a first embodiment of the invention;

Figure 1:
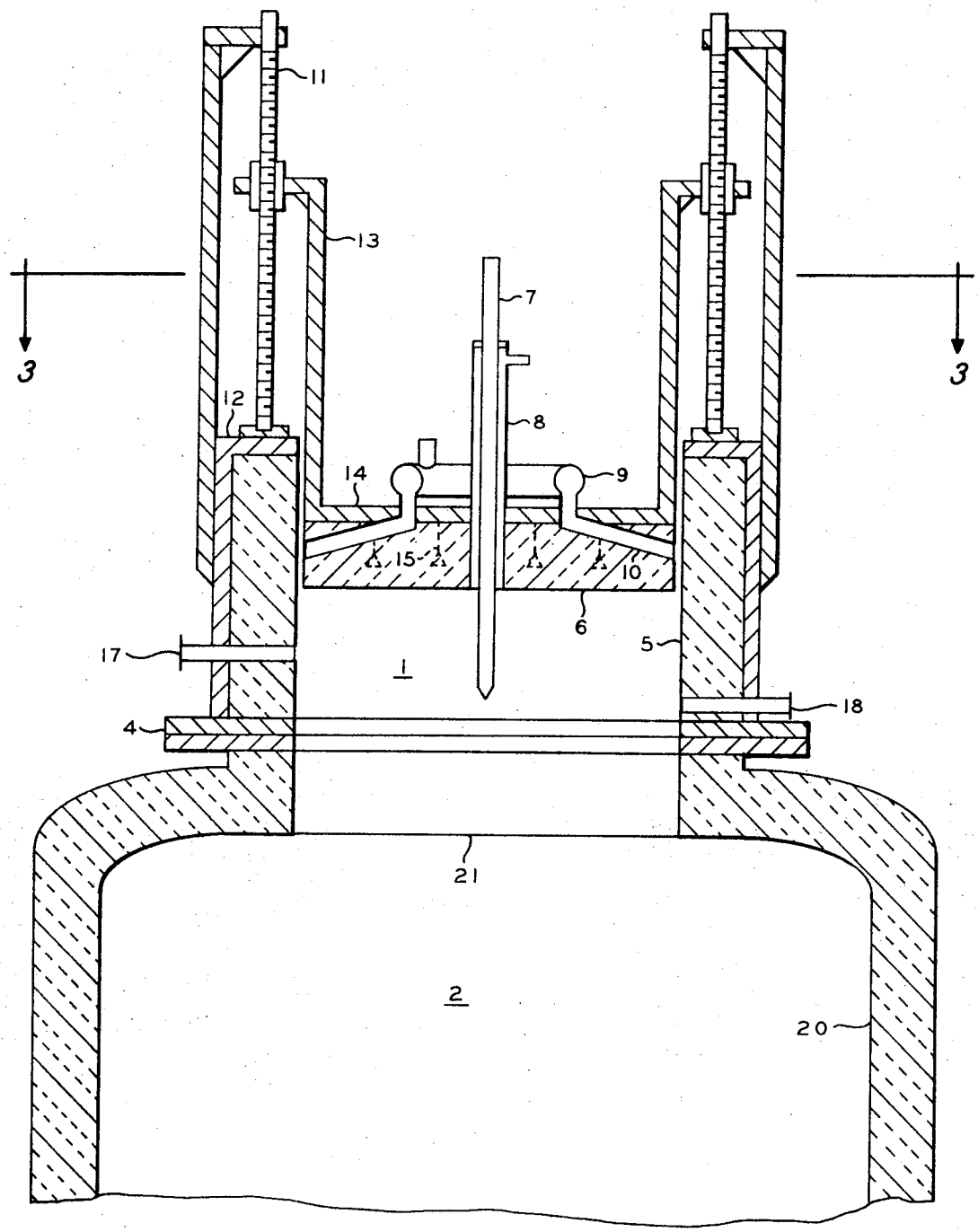

Referring now to FIG. 1, there is shown carbon black reactor 20 comprised of a first section 1 and a second section 2, these two sections being separably connected by means of matching flanges 4.

In general, the lower section of the reactor comprising the second reaction section, quench section and reactor outlet will be as depicted in application Ser. No. 845,959, filed July 30, 1969, allowed July 6, 1970, now U.S. Pat. No. 3,560,164, to Charles R. Venable. That reactor is comprised of sections 3, 4, 5 and outlet conduit 6 as illustrated in FIG. 1 thereof, and possessing reactant inlet conduit means, and the like as described, which patent is incorporated herein by reference.

Flanged to the upper flange thereof according to the present invention is first section 1 which is preferably of smaller diameter than lower section 2 which is preferably of substantially uniform diameter. While the first section can be of any diameter in relation to lower section, it will preferably have a cross sectional area from about 0.3 to about 0.7 of that of the lower section.

The first section will be constructed of walls 5 which can be of a refractory construction similar to those of the lower section. It will also be equipped with movably positionable upstream wall 6 which is positionable along the longitudinal axis of the reactor to alter the length of upper section from a maximum length to substantial elimination when positioned at its lowermost position between walls 5 at the inlet to the second section as shown at imaginary line 21.

Wall 6 is constructed of suitable refractory materials. It is adapted with suitable conduit means 7 for the introduction of reactant hydrocarbon or feed and with conduit means 8 for the introduction of an oxidant such as air. It will also be equipped with conduit header 9 and conduit means 10 for the introduction of a gaseous fluid, preferably air, peripheral to the wall, between its outer edges and the inner surface of the encompassing wall.

Any suitable number of conduit means can be employed, it only being desirable to provide discharge at a sufficient number of points around the periphery of wall 6 to prevent blackflow of gases from the interior of the reactor.

Figure 3:
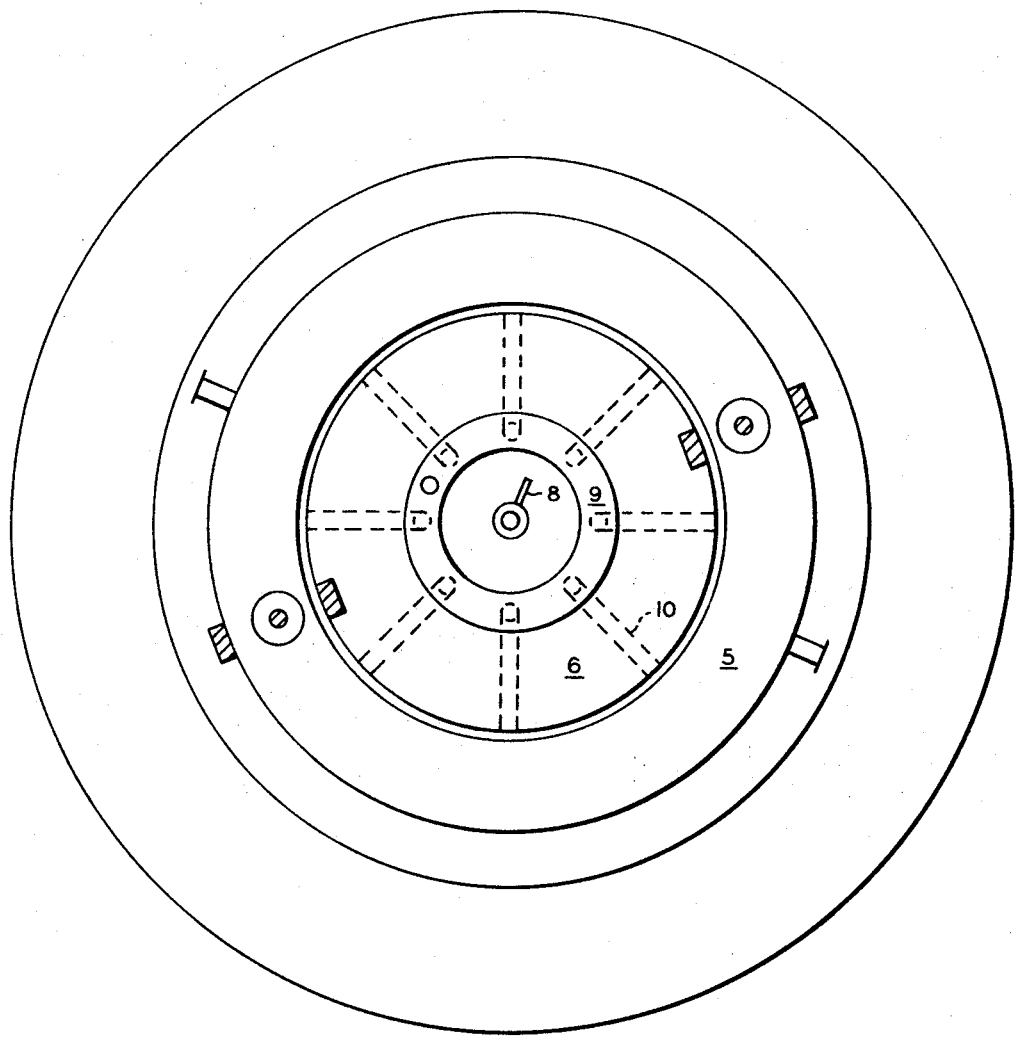
FIG. 3 is a cross section through section 3—3 of FIG. 1.

The disposition of conduit means 10 in wall 6 is shown in FIG. 3. Referring thereto there are, for example, eight conduits adapted to discharge around the periphery of the wall.

Wall 6 is movable upwardly and downwardly within walls 5 to alter the length of zone 1 by any suitable means including adjustable jack-screw 11 bearing on plate 12 on wall 5. Wall 6 has plate 14 affixed to plate 13, the refractory of wall 6 being suspended by means of anchors 15 from plate 14. Any number of anchors which give adequate support to the insulation comprising wall 6 can be employed.

Similarly, any number of jack-screw adjustment means can be employed depending upon the diameter and weight of wall 6.

Figure 2:
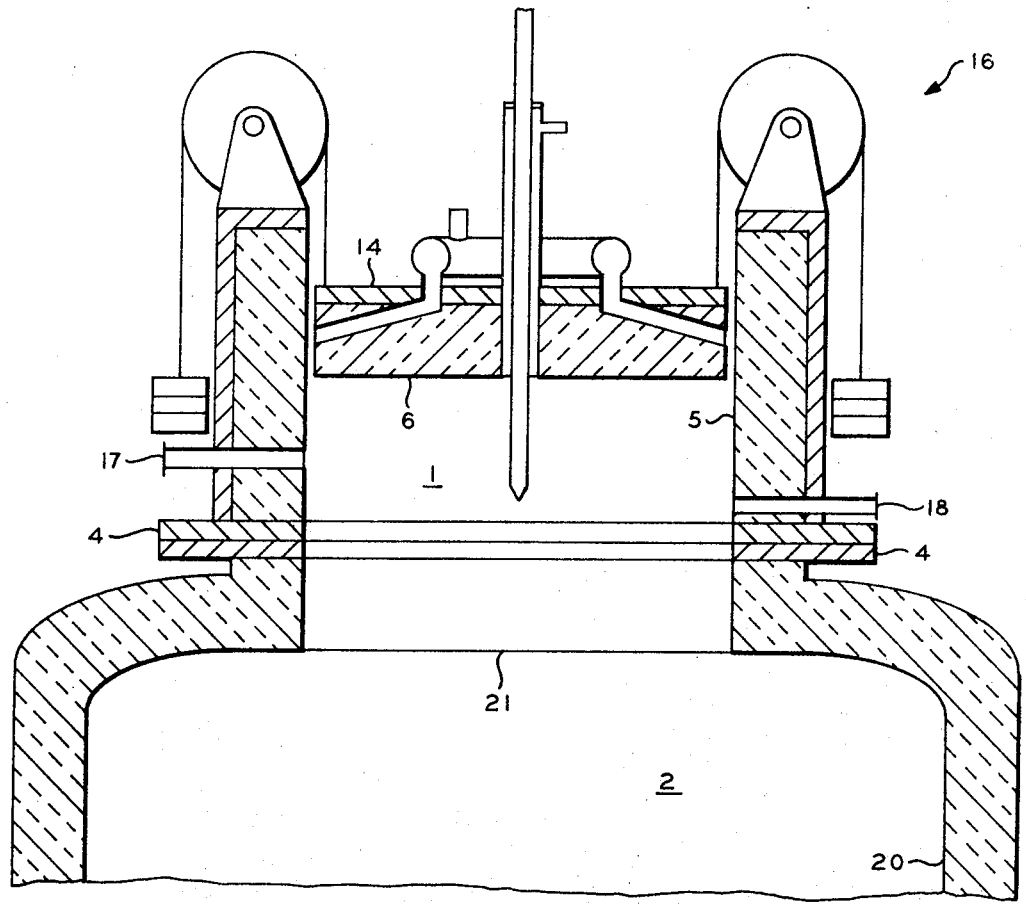
FIG. 2 illustrates a second embodiment of this invention.

FIG. 2 indicates another adjustment means suitable for positioning wall 6 at selected distances within walls 5. In this instance a weighted pulley arrangement 16, supported from wall 5 is employed, the pulley being interconnected to plate 14 in any suitable manner, weights being removed or added to a plurality of pulley arrangements depending upon whether wall 6 is to be moved upward or downward. It can be appreciated that other means of adjusting the position of wall 6 can also be employed.

Various modifications can be made to the construction of this reactor, these including the positioning of inlet conduit 17 and 18 penetrating wall 5 at various positions along its length. Suitable other conduits can also be provided.

The operation of the apparatus of this invention is comparable to that operation of other carbon black reactors. When once the determination is made as to the type of carbon black which is produced at various operating conditions at various settings of wall 6 within wall 5, these conditions are selected as the nature of the desired product dictates. Similarly, when it is desired to produce large particle black, wall 6 is lowered to the fullest extent within walls 5 or, if preferred, the upper section is detached from the reactor and a stationary head attached to the reactor by means of flanges 4. In either instance, carbon blacks of a wide range of properties can be produced.

It will be seen that the above reactor is one in which its first reaction section can be altered from a maximum length substantial elimination depending upon the point at which the movably positionable upstream wall is located.

It will be evident that various modifications can be made to the method of this invention. Such are considered, however, to be within the scope of the invention.

What is claimed is:

1. A carbon black reactor comprising upper and lower sections in contiguous relationship, said upper section being adapted with a movably positionable wall closing the upstream portion of said reactor and with side walls, said movably positionable wall being positionable along the longitudinal axis of said reactor to alter the length of said upstream section, said upper section having a cross-sectional area less than the cross-sectional area of said lower section, said upper section being of a maximum length when said movably positionable wall is positioned at a maximum upstream position and said upper section being substantially eliminated when said movably positionable wall is positioned at the inlet to said lower section, said movably positionable wall comprising a portion of a movable head, said movable head being adapted with cooling means comprising a header and a plurality of conduits opening from said header, said conduits being positioned in said movably positionable wall and discharging therefrom into contact with said side walls to cool said movably positionable head and said side walls.

2. The reactor of claim 1 in which the cross sectional area of said upper section is within the range of from about 0.3 to about 0.7 of the cross sectional area of said lower section.

3. The reactor of claim 1 in which said wall is positionable along the longitudinal axis of said reactor by jack-screw means.

4. The reactor of claim 1 in which said wall is positionable along the longitudinal axis of said reactor by pulley means.

5. The reactor of claim 1 in which said wall is adapted with conduit means for introduction of a gaseous fluid peripheral to said wall.

* * * * *